United States Patent [19]

Drewery

[11] Patent Number: 4,843,468
[45] Date of Patent: Jun. 27, 1989

[54] SCANNING TECHNIQUES USING HIERARCHICAL SET OF CURVES

[75] Inventor: John O. Drewery, Sutton, United Kingdom

[73] Assignee: British Broadcasting Corporation, London, England

[21] Appl. No.: 72,889

[22] Filed: Jul. 14, 1987

[30] Foreign Application Priority Data

Jul. 14, 1986 [GB] United Kingdom ............... 8617076

[51] Int. Cl.⁴ .................... H04N 7/01; H04N 5/30; H04N 3/30; H04N 7/00
[52] U.S. Cl. .................................... 358/140; 358/217; 358/209; 358/83; 340/744; 364/518; 365/23
[58] Field of Search ............... 358/138, 217, 218, 209, 358/242, 83, 140; 315/378; 364/518, 521; 365/14, 23; 340/744

[56] References Cited

U.S. PATENT DOCUMENTS

| | | | |
|---|---|---|---|
| 2,222,934 | 11/1940 | Blumstein | 358/217 |
| 2,899,495 | 11/1959 | Gibson et al. | 358/162 |
| 2,911,463 | 11/1959 | Kretzmer | 358/260 |
| 3,200,195 | 8/1965 | Davis et al. | 358/242 |
| 3,309,461 | 3/1967 | Deutsch | 358/138 |
| 3,342,937 | 9/1967 | Deutsch | 358/138 |
| 3,499,980 | 3/1970 | Jmierciak | 358/138 |
| 3,792,196 | 2/1974 | Wendland | 358/217 |

Primary Examiner—James J. Groody
Assistant Examiner—John K. Peng
Attorney, Agent, or Firm—Robert F. O'Connell

[57] ABSTRACT

Conventionally, transmission of television images is performed by Raster scanning. To avoid the problems associated with flyback, and the limiting of Raster scanning to image scanning standards it is proposed to transmit images by scanning along a locus defined by a fractal curve. A Peano curve is particularly suitable. Image resolution may be varied by varying the order of curve used to scan the image. Smoothing of a curve of a given order results in a graceful degradation to a curve of lower order so that the image created by a given order is still recognizable when displayed by a lower or higher order.

14 Claims, 13 Drawing Sheets

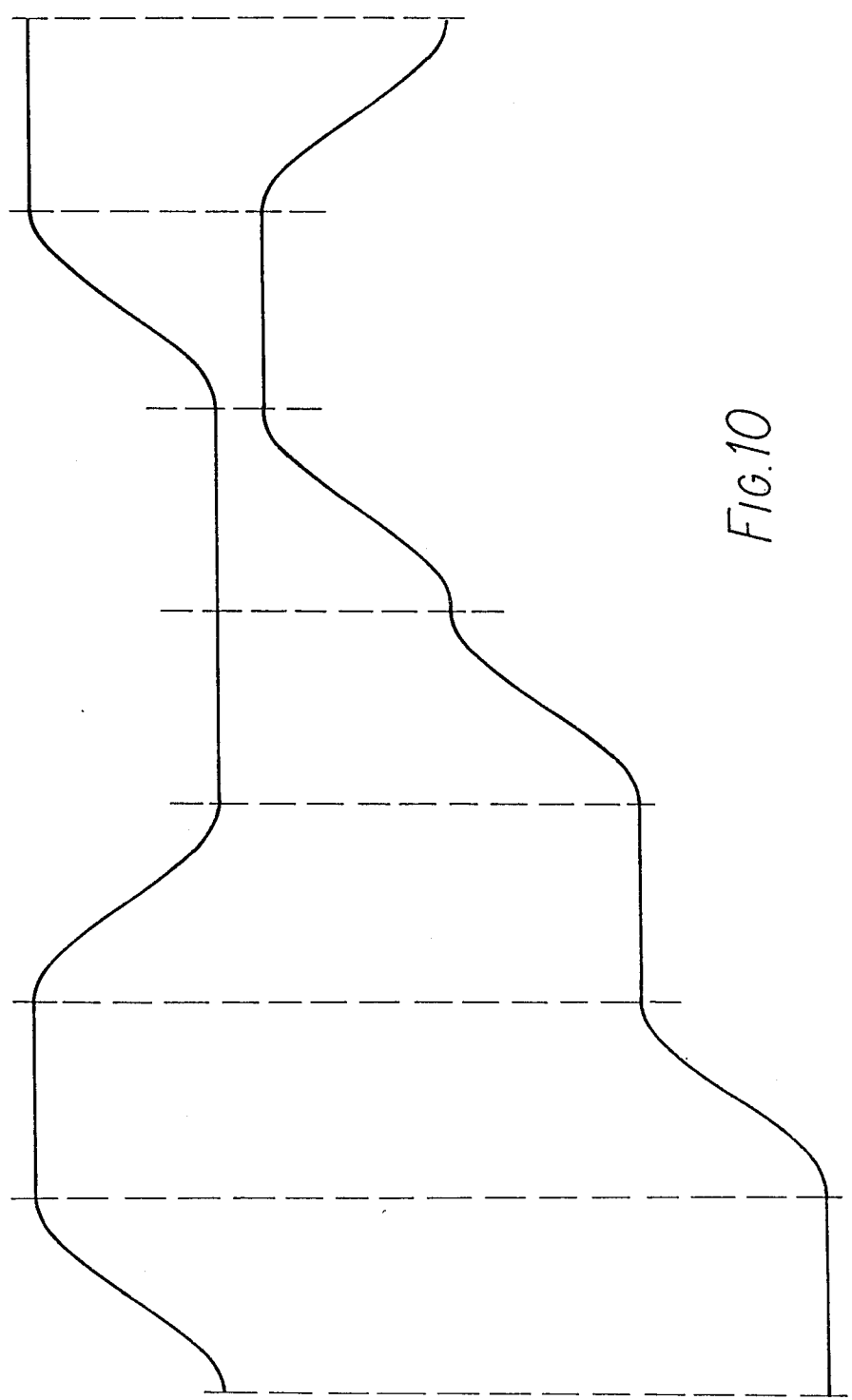

SCANNING TECHNIQUES USING HIERARCHICAL SET OF CURVES

This invention relates to video scanning systems for use for example in television.

Transmission of images by television is conventionally performed by raster scanning in which a signal is formed by scanning the image in a series of parallel lines, either horizontal or vertical. In broadcast television the scan starts at the top left hand corner and finishes at the bottom right hand corner, the scan lines being horizontal. Moreover, each line is scanned in the same direction so that the scan must return to the beginning of each line in, ideally, an infinitessimally short time. Such an action is known as the flyback.

The scanning in conventional imaging and display devices is by way of a continuously moving electronic beam which is deflected by electric or, usually, magnetic fields. With such devices the beam flyback takes a finite time which is, therefore, an "overhead". The horizontal scanning waveform, which is proportional to the deflecting field, therefore appears as in FIG. 1, the idealised version of which is known as a sawtooth waveform.

Similarly, the vertical scanning waveform needed to ensure the equal spacing of the scan lines is another sawtooth, though of much lower frequency. This has a corresponding flyback, imposing a further "overhead". It should be noted that the continuous nature of the vertical scan imposes a continuous vertical displacement on the scan lines so that they are not strictly horizontal. However, the skew thus imposed is negligible.

The large rate of change of the flyback in the horizontal scan waveform is used to provide the high voltage needed in a conventional CRT display. However, it can cause problems if the line rate is increased to provide scanning for higher definition formats since the flyback time of conventional deflection circuits may become a significant proportion of the line period. For this reason, UK Patent Application No. 2,137,844A has proposed a boustrophedonic scanning format in which lines are alternately scanned in opposite directions. This requires a triangular form for the horizontal scan waveform as shown in FIG. 2 (a). This eliminates the flyback, but the sawtooth of the vertical scan must now be modified to a stepped form as shown in FIG. 2 (b) to ensure that adjacent lines are parallel. It also requires that nonlinearities in the horizontal scan waveform result in a symmetrical function as shown in FIG. 3.

A disadvantage of raster-based scanning is that it is committed to a standard in the form of lines in the picture. This means that once an image scanning standard is chosen the display must adopt the same standard, or convert the incoming signal to its own line standard, which is a complex and costly process. Moreover, any curtailment in the bandwidth of an analogue channel used to carry the signal will affect only the horizontal resolution of the image, not the vertical resolution. Excessive curtailment will therefore give an unacceptable image quality, inferior to that which could be obtained with equal horizontal and vertical resolutions.

The present invention is defined by the appended claims to which reference should now be made.

The invention is applicable to both analogue and digital scans. In the former case the image is scanned along a trace formed by a defined co-ordinate sequence, and in the latter case the pixels of the image are scanned in that co-ordinate sequence.

We have appreciated that it would be possible to have a scanning format which is not committed to a line standard and therefore is open to evolution, i.e., the image scanning may be upgraded in acuity without needing a change in the structure of the display. This means that it is downwards compatible. Moreover, it is possible for such a format to be upwards compatible such that the display can be upgraded without changing the source scanning format. Such a technique relies on the use of FRACTALS for defining the scanning locus.

Fractals may be described as structures whose length is undefinable or infinite as the finer the scale used to observe the structure, the greater the apparent length. An example of such a structure is a coastline. The closer it is observed, the greater its length becomes as finer detail becomes resolved.

Such self-similar shapes are neither one- nor two-dimensional shapes as they are defined by conventional Euclidian geometry. That is, they have a fractional dimension.

Fractals may be identical on each level or scale, or may be irregular. A coastline is an irregular fractal. FIG. 4 shows how a regular fractal may be generated. This example is the well known Koch curve or Koch snowflake. The straight sides of an equilateral triangle FIG. 4b (the initiator shown in FIG. 4a) are operated on by a generator shown in FIG. 4a. This operation produces the result shown in FIG. 4c. The operator is then applied to each of the sides of the shape of FIG. 4c and then subsequently to the sides of the resultant figure, and so on. The result is a figure resembling a snowflake.

It can be shown that the fractal dimension can be defined as $$D = -\log(N)/\log(1/r)$$

where N is the number of parts of the objected generated and $1/r$ is the similarity ratio which is used to divide the initiator. For the Koch curve of FIG. 4; $N=4$ and $1/r=\frac{1}{3}$ so that $D=1.26$ A fuller description of fractals can be found in the book: Mandlebrot FRACTALS—Form, Chance and Dimension, W.H. Freeman, ISBN 0-7167-0473-0. The use of fractals in the field of computer graphics to simulate texture is well established. The use of a fractal curve to explore a multi-dimensional space is known from Stevens, R. J., Lehar, A. F. and Preston, F. H. 1982, "Data ordering and compression of multi-spectral images using the Peano scan", International Conference on electronic image processing July 26-28 1982, IEE conference publication No. 214 pages 209-213. However, the use of a fractal curve to scan an image for transmission and display, with its attendant advantages is thought to be novel.

The invention will be disclosed in terms of a particular fractal—The Peano curve, named after the Italian mathematician Giuseppe Peano, see "Selected works of Guiseppe Peano" translated and edited by Hubert C. Kennedy, ISBN 0-04-164002-0, Allen and Unwin. It is also called Hilbert curve. However, other forms of fractal may be more suitable, in particular the Sierpinski curve, described by Writh, N. in "Algorithms+data structures=programs", Prentice-Hall Inc., ISBN 0-13-022418-9 pages 134–137. In general, the curve may be multi-dimensional; only the two dimensional form is discussed in detail here.

The invention will be described by way of example with reference to the drawings, in which:

FIG. 10 illustrates a portion of the horizontal and vertical waveforms interpolated by a raised cosine filter;

Figure 1:
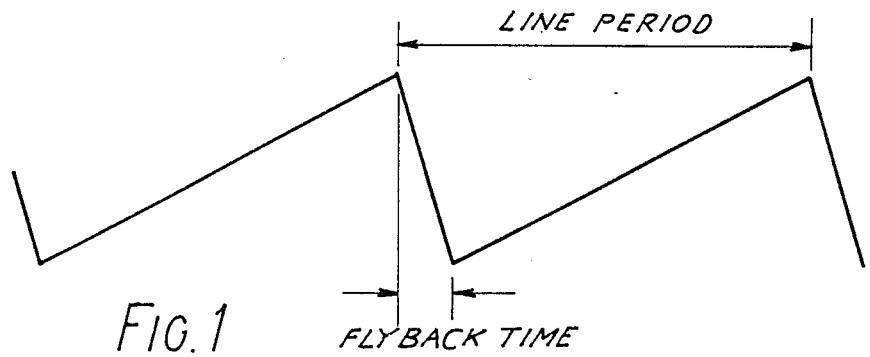
FIG. 1 (referred to above) illustrates the sawtooth waveform of conventional raster scanning.
Figure 2:
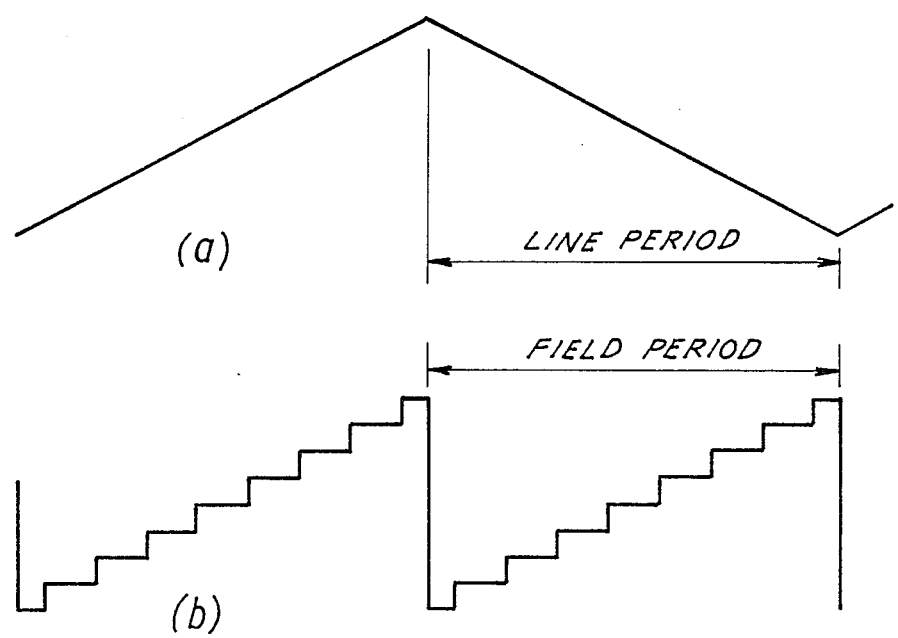
FIG. 2 (referred to above) shows the waveforms required for boustrophedonic scanning in (a) the horizontal (b) the vertical directions.
Figure 3:
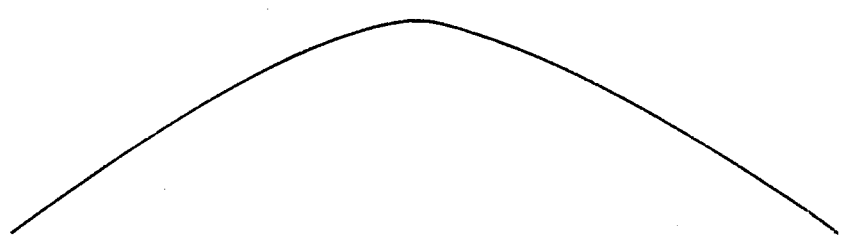
FIG. 3 (referred to above) illustrates the permissible nonlinearity of the horizontal scan in boustrophedonic scanning.
Figure 4B:
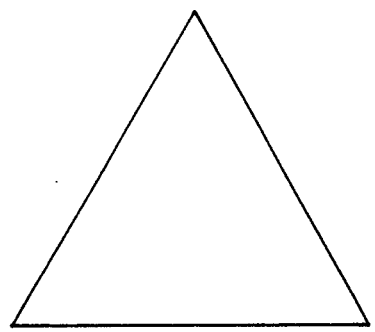
FIG. 4 (referred to above) illustrates the steps in generating a Koch curve.
Figure 4C:
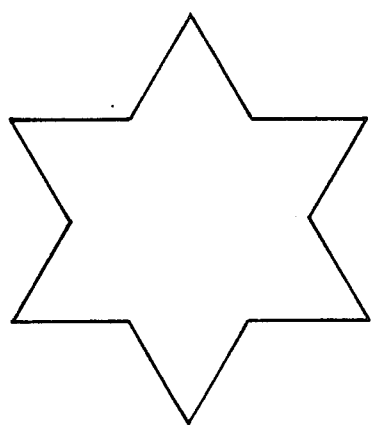
Figure 4A:
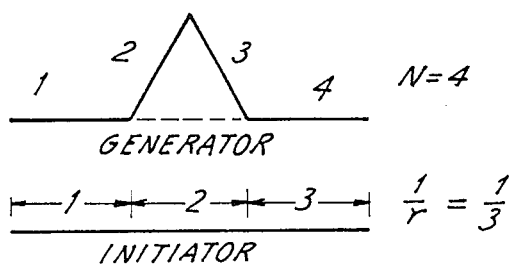
Figure 5:
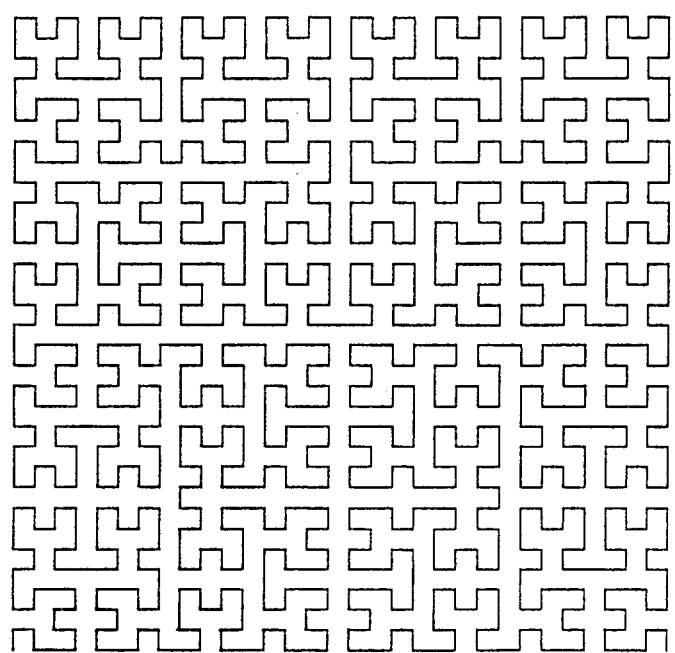
FIG. 5 illustrates a fifth-order (32×32) Peano curve.

FIG. 5 shows a two-dimensional fifth-order Peano curve, i.e., a curve connecting an array of 32×32 points. Close inspection shows that it can be divided into quarters, each of which is connected by a single step. The quarters, in turn, can be further subdivided into quarters, again connected by only a single step, and so on. Further, the quarters are seen to be replicas, either directly or rotated through a right angle.

Figure 6:
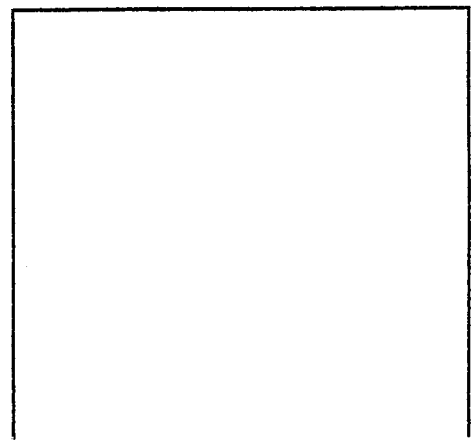
FIG. 6 illustrates a first-order (basic) Peano curve.
Figure 7:
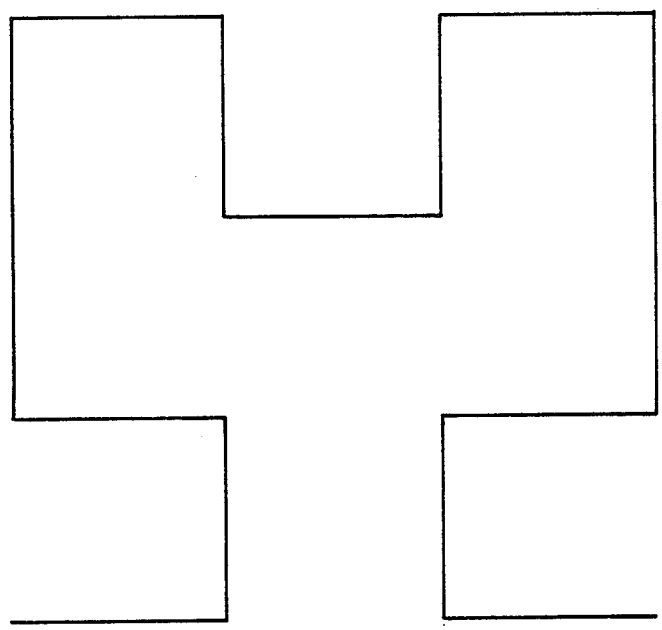
FIG. 7 illustrates a second-order Peano curve.
Figure 8:
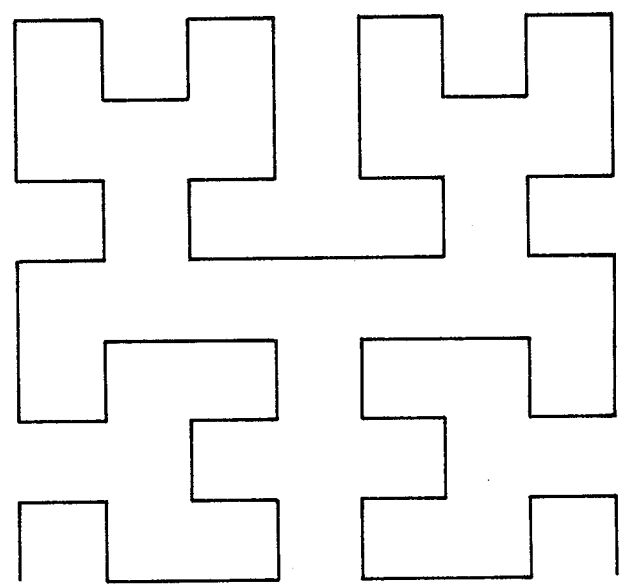
FIG. 8 illustrates a third-order Peano curve.

FIGS. 6, 7 and 8 show the first, second and third order curves respectively. It can be seen that each order is derived from the previous order according to simple geometrical rules. Alternatively, the derivation of each order can be considered by way of the Cartesian coordinate sequences as shown in the Appendix below. These sequences, when interpolated, are the waveforms that would need to be applied to the horizontal and vertical deflection circuits of a conventional camera tube or CRT display. Alternatively, they are the horizontal and vertical addressing sequences that would be needed for a discrete display device. The derivation process can be repeated indefinitely to yield higher and higher order curves connecting more and more points.

The Peano scan has three important properties relevant to scanned images:

1. It gives a means of simultaneously altering the horizontal and vertical resolution of the image.
2. The set of curves for different orders form a hierarchical family capable of resolving finer and finer detail.
3. The curves for a particular order 'gracefully degrades' to the previous order when smoothed.

The first property arises because the signal obtained by scanning has information in the horizontal and vertical directions in alternating or near alternating fashion. As a result, if the bandwidth of the signal is limited by a bearer channel the resolution of the image is limited equally in both directions. This is the optimum way of using the available bandwidth.

The second property arises because each order is derived from the previous one and so creates compatibility. Taking a running average of four coordinate values and then selecting every fourth average produces the coordinate values of the previous order.

Figure 9:
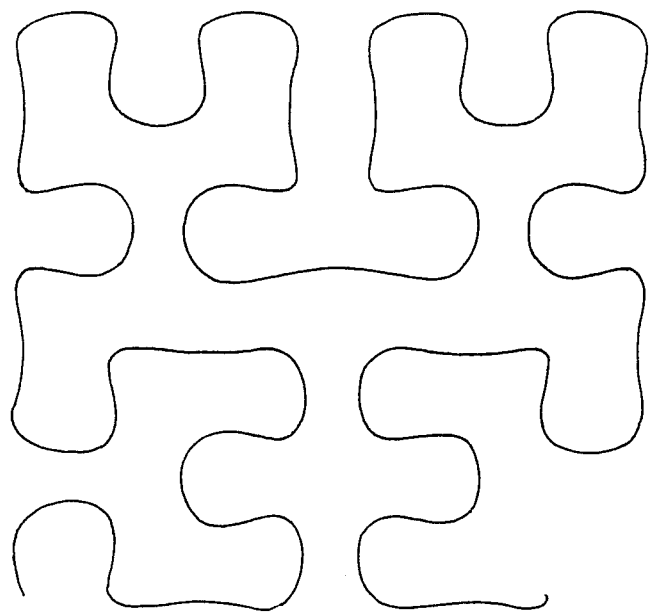
FIG. 9 shows the smoothed third-order curve resulting from band-limiting the coordinate waveforms fairly sharp to half the pixel frequency.

The third property is relevant only to continuous scanning devices such as those using electron beams. The curves in FIGS. 5 to 8 are idealised in the sense that, if the continuously moving scanning spot traces the curve at a constant speed, the x and y coordinate waveforms would be band-limited which would, in general, smooth the corners of the scan. FIG. 9 shows the effect of limiting the bandwidth of the waveforms using a particular filter characteristic which cuts at half the pixel frequency, that is the frequency at which x,y point co-ordinates are generated. This operation would be carried out by the filters following the digital-to-analogue converters generating the waveforms from the coordinate sequences.

There is, however one special case where limiting the bandwidth of the waveforms does not smooth the curve. This is the case of a simple raised-cosine filter pulse response, the base width of the pulse being the pixel spacing. FIG. 10 shows a portion of the waveforms when so filtered. As can be seen, at the ideal point values, each coordinate has zero rate of change and neither overshoots. This means that the spot comes momentarily to rest and, as only one coordinate changes at any time, the motion passes smoothly from one coordinate to the other.

Figure 11:
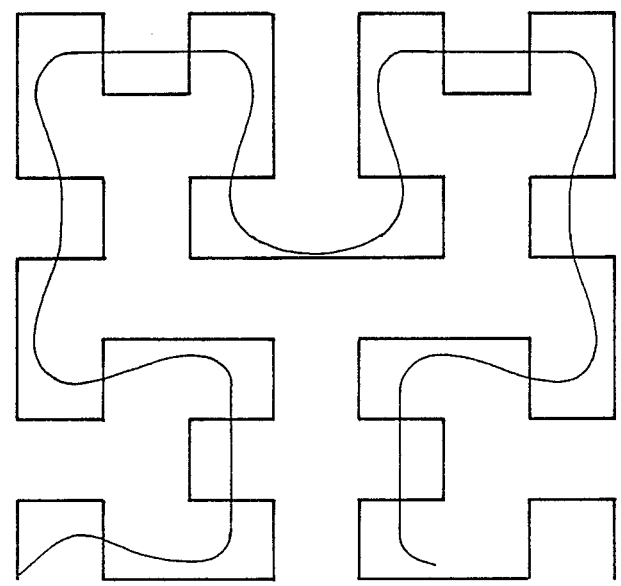
FIG. 11 illustrates the effect of four-fold averaging and interpolation (filtering) of the scan.
Figure 12:
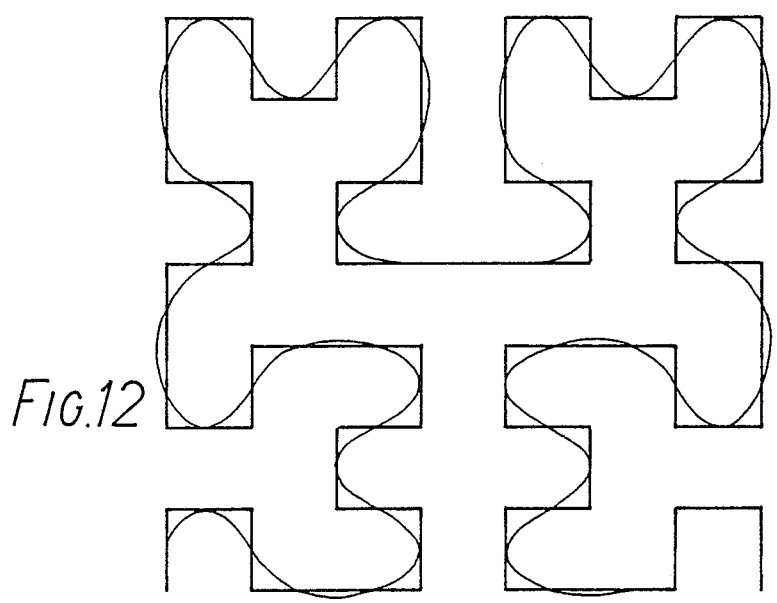
FIG. 12 illustrates the effect of two-fold averaging of the scan.
Figure 13:
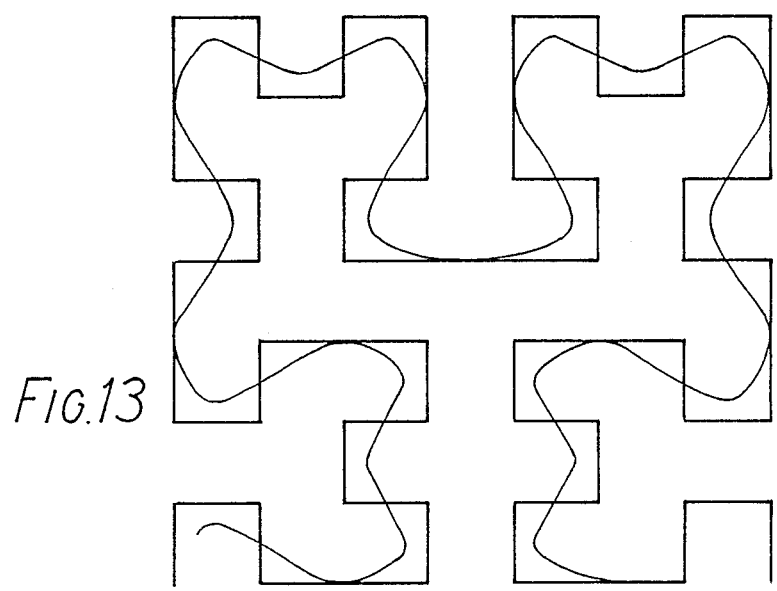
FIG. 13 illustrates the effect of three-fold averaging of the scan.
Figure 14:
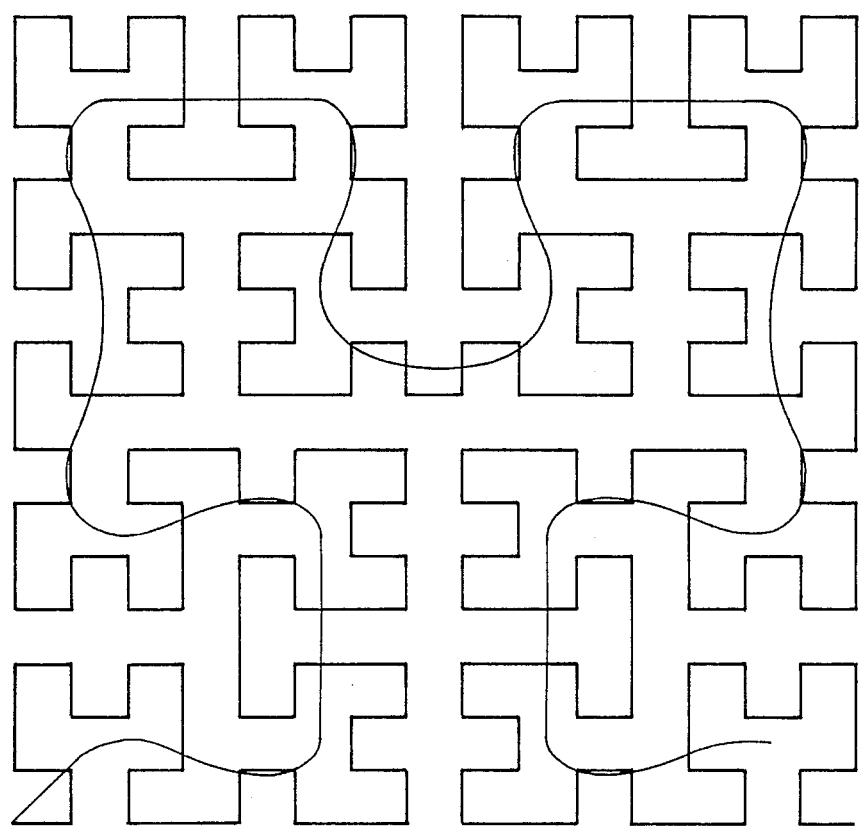
FIG. 14 illustrates the effect of 16-fold averaging of the scan.

FIG. 11 shows the result of smoothing the scan by taking a running average of four coordinate values and filtering with the first filter. As can be seen, the scan closely resembles that of the previous order except for slight overshoots. FIGS. 12 and 13 show the intermediate situations of two- and three-fold averaging and these clearly show how the scan gradually changes from one order to the next. The two-fold averager appears to join half the number of points, corresponding to a step of half an order. To obtain the next lowest order, appearing to join one sixteenth of the number of points, a 16-fold averaging is necessary, shown in FIG. 14. This again closely resembles the ideal curve. Likewise, an eight-fold averager appears like the two-fold averager of FIG. 12 but one order lower. Averaging by any amount in between corresponds to a curve with intermediate detail. As averaging is a form of low-pass filtering this means that gradually reducing the bandwidth of the coordinate functions causes the curve to gradually change from one order to the next, always retaining its fractal nature.

Given that either the video signal or the scan waveforms may be band-limited to an arbitrary degree, three cases arise at the display. These are:

1. The video and scan bandwidths are equal.
2. The video bandwidth is less than the scan bandwidth.
3. The video bandwidth is greater than the scan bandwidth.

Figure 15:
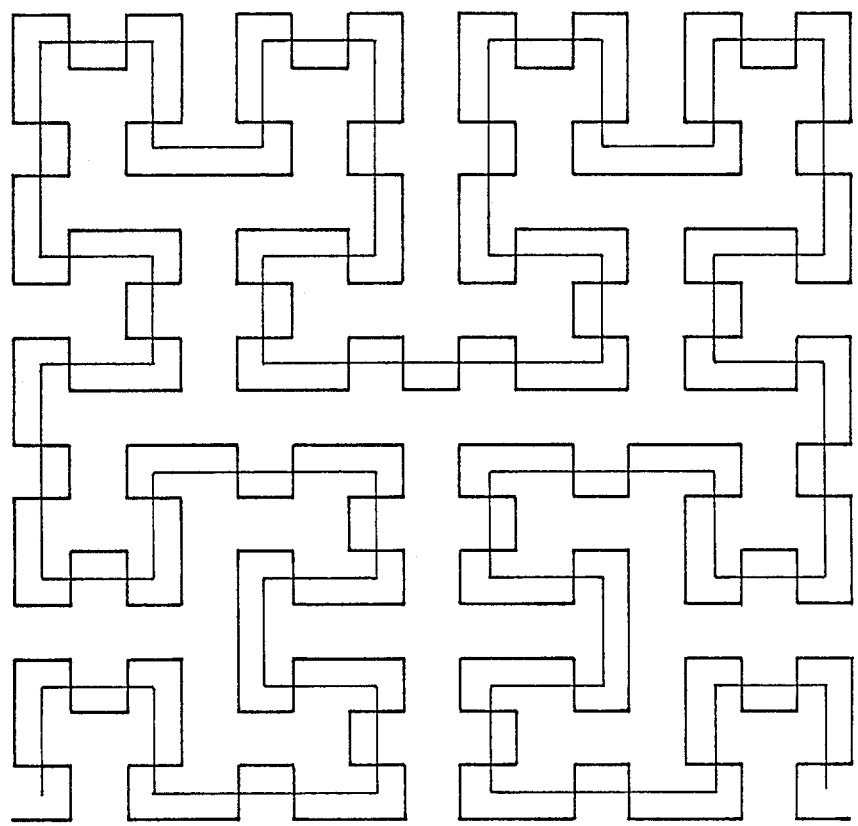
FIG. 15 illustrates the superposition of the third and fourth-order scans.

The first case is straightforward in that there are as many independent video samples as there are points in the scan so that each point contributes maximally to the resolution. In the second case the video signal is not changing as fast as it can from point to point and so the resolution is limited by the signal. In the third case the source scan is assumed to be of a higher order than the display. In this case the display will average out of the signal by superposition, either exactly, if discrete, or approximately, if continuous. This can be appreciated by considering adjacent orders of scan. FIG. 15 shows the superposition of third and fourth-order scans. As can be seen, the higher order scan is never more than half a pixel displaced from the lower order. Thus, four adjacent samples of a signal derived on the higher order, if displayed by a continuous scan on the lower order, will suffer no more than half a pixel displacement and so will tend to superpose.

This compatibility between different situations carries the important implication that it is not necessary to know the order of the scan in order to reproduce a version of the image. Thus we have an image transmission system which is independent of the number of pixels in the image. Only the number of fields per second, the form of the fractal (i.e., that it is a Peano curve) and the starting and finishing points need to be standardised.

Thus we have a hierarchical family of scanning standards for transmitting and displaying images such that an image scanned by one member of the family may be displayed by another member of the family without knowledge of the first member. Such an arrangement allows an evolution of scanning acuity to occur.

Figure 16:
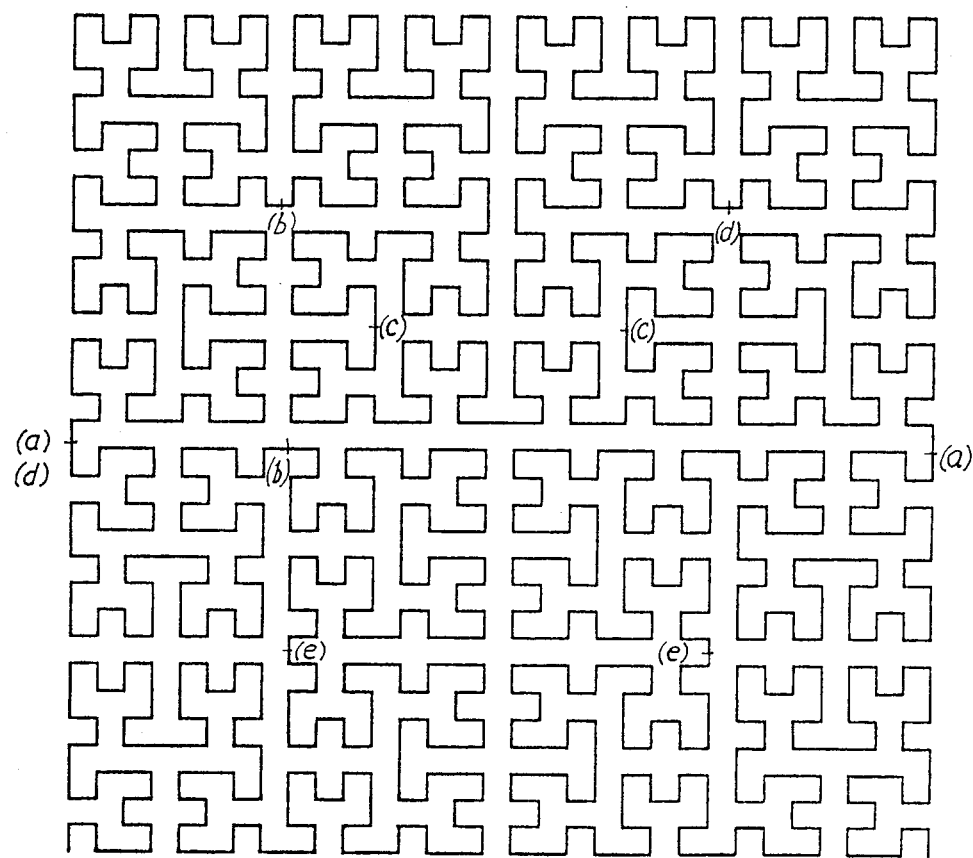
FIG. 16 shows the starting and finishing points for various aspect ratios: (a) 2:1 (b) 3:1 (c) 4:1 (d) 3:2 (e) 4:3.

An apparent theoretical objection to the idea is that it can be applied only to square arrays of points. Arbitrary image aspect ratios are not possible. However, ratios of 2:1 3:1 4:1 3:2 and 4:3 are possible by starting and finishing at the points shown in Figure 16. Small deviations from these values are possible by altering the pixel aspect ratio without departing significantly from the spirit of isotropic resolution.

Because the scan is contiguous there is no flyback except between fields and thus time is saved. Even field flybacks may be eliminated by using a modified square scan consisting of two 2:1 scans joined at their endpoints. Alternatively, a Sierpinski curve may be used which has an inherently endless form. In such a case, synchronising information would have to be sparse, compared with the present systems, possibly consisting of a recognisable framing pattern.

The system is particularly suitable for use with imaging and display devices which are based on discrete rather than continuous scanning. These include systems comprising cameras based on charge-coupled devices (CCDs) for example. Addressable display devices would be particularly suitable.

Figure 17:
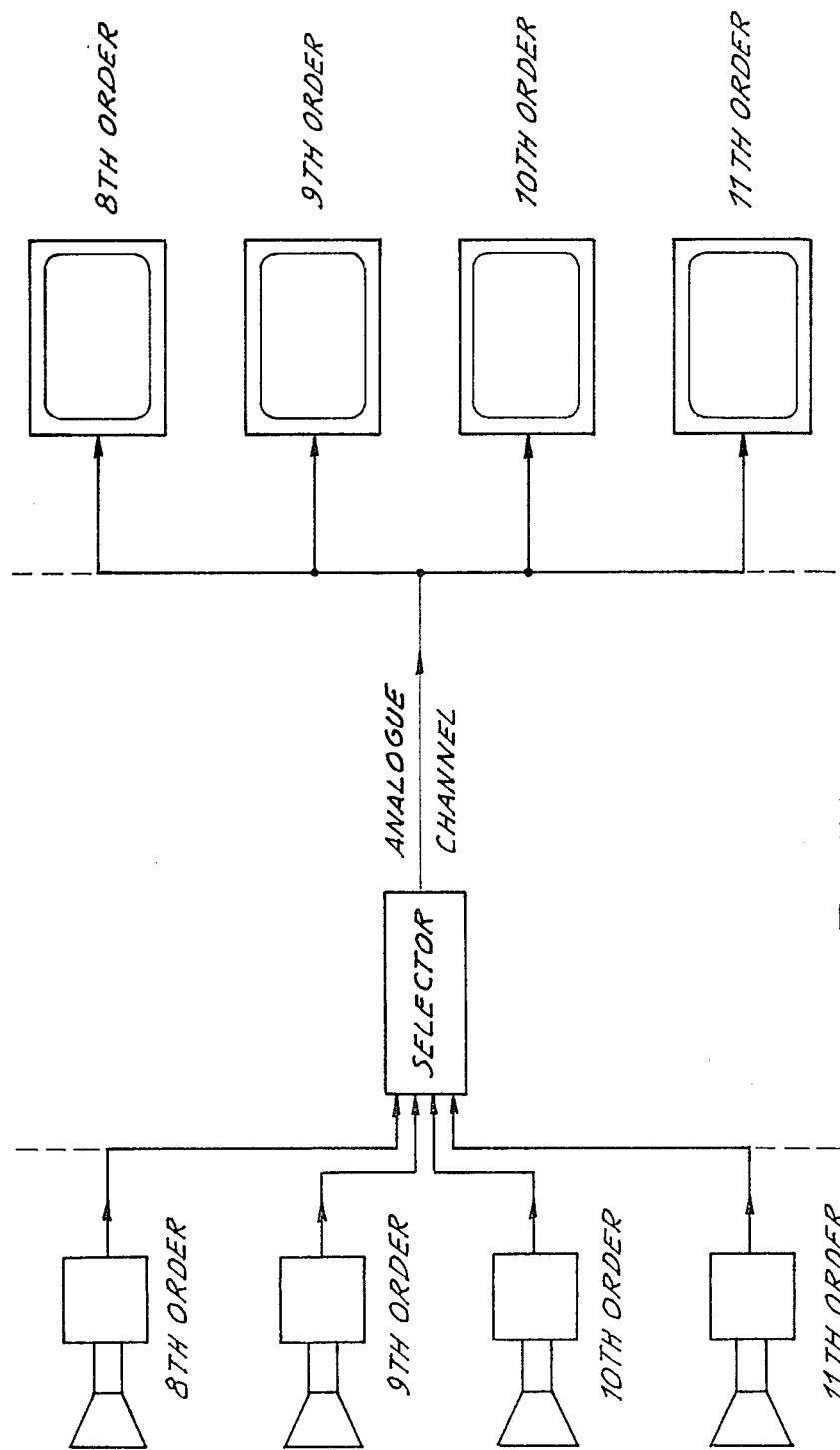
FIG. 17 is a block diagram of a television system embodying the invention.

An outline block diagram of a television system embodying the invention is shown in FIG. 17. Synchronised cameras operating with various orders of scan may be selected at will and their signals transmitted through the channel. The ninth-order scan camera represents, approximately, the current system. The eighth order scan camera represents, say, a low-resolution lightweight 'electronic journalism' camera whilst the 10th-order scan camera represents a high definition camera. They could be used in different programmes or even in the same programme. The 11th-order scan camera represents a camera which could be developed in the future, being introduced when required. The same remarks apply to the hierarchy of displays, the eighth-order display representing, say, a wrist-watch receiver based on a liquid crystal display.

Figure 18:
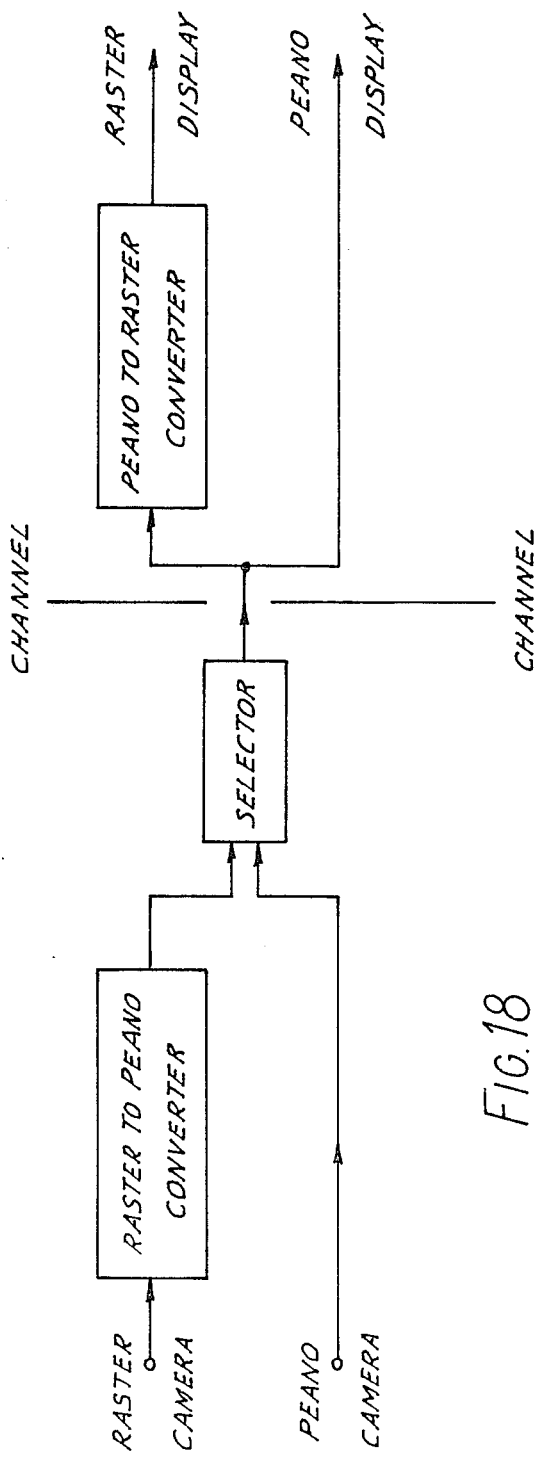
FIG. 18 is a block diagram illustrating conversion for compatibility with the current technology.

The system is capable of being introduced piecemeal and so thus coexisting with current scanning technology. If it were introduced on the channel then compatibility with current technology would require raster-to-Peano converters in conventional cameras and Peano-to-Raster converters in conventional displays, as shown in FIG. 18, the converters merely re-ordering the sequence of incoming pixel values. Such converters would consist simply of a picture store which would write the pixel data in one sequence and read it in another. This re-ordering of data could also be regarded as a scrambling technique to prevent unauthorised reception of a newly-introduced service.

Figure 19:
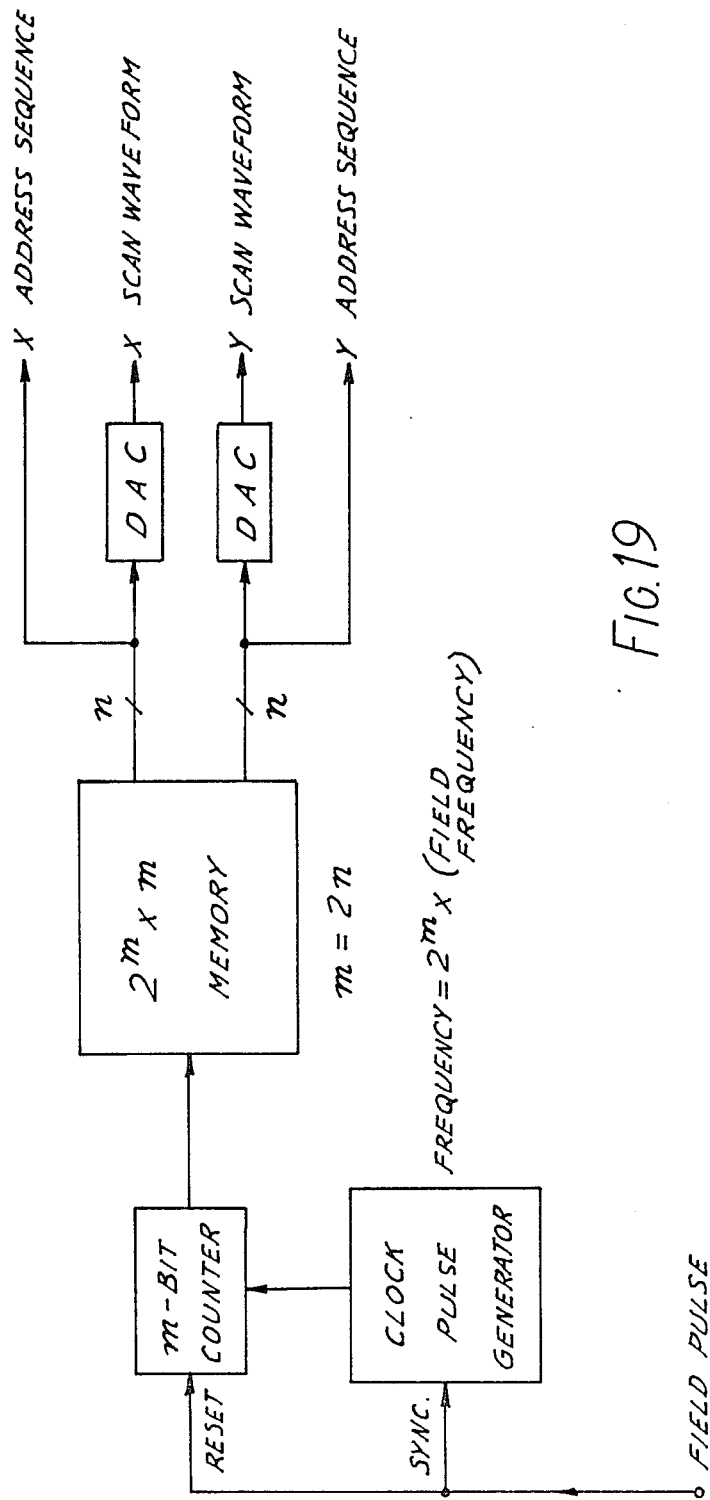
FIG. 19 is a block diagram of a basic current for generating an n-th order scan.

The scan could be generated using a memory addressed by a counter as shown in FIG. 19. An nth order scan would require a memory of $2^{2n}$ locations, each of 2n bits, containing n-bit x and y values and a 2n-bit memory counter able to count from 0 to $2^{2n}-1$. The contents of the memory could be derived according to the method described in the appendix below. The two outputs of the memory can be used directly to address a discrete scanning device. However, for a continuous scanning device the memory outputs need to be fed to two n-bit digital-to-analogue converters to produce continuous wave forms.

APPENDIX

Derivation of the Sequences

The x and y coordinate sequences for the first order case of Figure 6 are shown in Table 1, in units of the scan step. The y sequence is a palindrome and the x sequence is a complementary palindrome. The coordinate sequences of the second-order case, written in binary form, are shown in Table 2. As there are 4×4 points, each coordinate requires 2 bits and there are 16 entries. The more significant bit is seen to be a replication of the corresponding first-order pattern, each entry being replicated four times. The less significant bit is seen to be the sequence yxxy for the x coordinate or yxxy for the y coordinate where X and Y are the first-order patterns of the x and y coordinates. The first of these sequences is a complementary palindrome and the second is a palindrome.

TABLE 1

| x | y |
|---|---|
| 0 | 0 |
| 0 | 1 |
| 1 | 1 |
| 1 | 0 |

TABLE 2

| x | y | x | y |
|---|---|---|---|
| 00 | 00 | 10 | 10 |
| 01 | 00 | 10 | 11 |

TABLE 2-continued

| x | y | x | y |
|---|---|---|---|
| 01 | 01 | 11 | 11 |
| 00 | 01 | 11 | 10 |
| 00 | 10 | 11 | 01 |
| 00 | 11 | 10 | 01 |
| 01 | 11 | 10 | 00 |
| 01 | 10 | 11 | 00 |

TABLE 3

| x | y | x | y | x | y | x | y |
|---|---|---|---|---|---|---|---|
| 000 | 000 | 000 | 100 | 100 | 100 | 111 | 011 |
| 000 | 001 | 001 | 101 | 101 | 100 | 111 | 010 |
| 001 | 001 | 001 | 101 | 101 | 101 | 110 | 010 |
| 001 | 000 | 000 | 101 | 100 | 101 | 110 | 011 |
| 010 | 000 | 000 | 110 | 100 | 110 | 101 | 011 |
| 011 | 000 | 000 | 111 | 100 | 111 | 100 | 011 |
| 011 | 001 | 001 | 111 | 101 | 111 | 100 | 010 |
| 010 | 001 | 001 | 110 | 101 | 110 | 101 | 010 |
| 010 | 010 | 010 | 110 | 110 | 110 | 101 | 001 |
| 011 | 010 | 010 | 111 | 110 | 111 | 100 | 001 |
| 011 | 011 | 011 | 111 | 111 | 111 | 100 | 000 |
| 010 | 011 | 011 | 110 | 111 | 110 | 101 | 000 |
| 001 | 011 | 011 | 101 | 111 | 101 | 110 | 000 |
| 001 | 010 | 010 | 101 | 110 | 101 | 110 | 001 |
| 000 | 010 | 010 | 100 | 110 | 100 | 111 | 001 |
| 000 | 011 | 011 | 100 | 111 | 100 | 111 | 000 |

Development of the higher order cases proceeds along the same rules. The third-order case, shown in Table 3, has 64 entries of three bit values, the sequences of the first two bits of x and y being the same as those of the corresponding second-order case, each entry being replicated four times. The least significant bit of the x coordinate has the sequence XYYX YXXY YXXY XYYX where X and Y represent the same sequences as before. It can be seen that the initial sequence of each group of four follows the same pattern as the sequences in the first group. Likewise, the least significant bit of the y coordinate has the sequence YXXY XYYX XYYX YXXY. It will be noted that the least significant bits are appropriately palindromic or complementary palindromic.

The rule for derivation of the higher order cases is therefore.

1. The sequence of all but the least significant bit are those of the previous order, each entry being replicated four times.
2. The sequence of the least significant bit consists of groups of four sub-sequences, each taking the form ABBA.
3. The first sub-sequence of the nth group of four is the same as the nth sub-sequence.
4. A can be X or Y or X or Y. If A is X then B is Y and vice versa.
5. The first sub-sequence of x is X if the order is odd and Y if it is even, and vice versa for y.
6. X and Y are the x and y sequences of the first order case.

I claim:

1. A method of scanning an image to produce a signal for transmission and display, comprising scanning an image in a coordinate sequence defined by one order of a hierarchical set of fractal curves.

2. A method of scanning according to claim 1 comprising filtering the co-ordinate sequence by means of a filter having a raised-cosine pulse response.

3. A method of scanning according to claim 1 comprising filtering the co-ordinate sequence according to a filter characteristic which cuts at half the pixel frequency, to smooth the fractal curve.

4. A method according to claim 3 comprising filtering the running average of four coordinate values to smooth said fractal curve.

5. A method according to claim 1 wherein the co-ordinate sequence is defined by a Hilbert curve.

6. A method according to claim 1 wherein the co-ordinate sequence is defined by a Sierpinski curve.

7. A television camera, comprising means for forming a signal indicative of an image to be transmitted, the signal forming means comprising means for scanning the image in a co-ordinate sequence defined by one order of a hierarchical set of fractal curves.

8. A television camera according to claim 7 wherein the camera is one of a plurality of synchronised cameras each having said signal forming means, each camera being coupled to a selector means for selecting the output from one of said cameras and transmitting the output to a display, the selector being capable of selecting signals representing different orders of fractal curves.

9. A television receiver, comprising means for receiving a signal indicative of an image to be displayed, the signal receiving means comprising means for scanning the display along a co-ordinate sequence defined by one order of a hierarchical set of fractal curves to form said image from said signal.

10. A television receiver according to claim 9, comprising signal converting means for converting the received fractal signal into a signal suitable for display on a raster display.

11. Apparatus according to claim 7 wherein the scanning means comprises means for scanning along a co-ordinate sequence defined by one order of a Hilbert curve.

12. Apparatus according to claim 7 wherein the scanning means comprises means for scanning along a co-ordinate sequence defined by one order of a Sierpinski curve.

13. A television camera comprising a conventional raster camera, the raster output of which is coupled with converting means for converting a signal produced by a raster scan to a fractal signal.

14. A television camera according to claim 13 wherein the converting means comprises picture storage means, means for writing pixel data from the raster scan into said picture storage means in a given sequence; and means for reading said pixel data from said storage means in a different given sequence.

* * * * *

REEXAMINATION CERTIFICATE (2155th)
United States Patent [19]
Drewery

[11] B1 4,843,468
[45] Certificate Issued Dec. 21, 1993

[54] SCANNING TECHNIQUES USING HIERARCHIAL SET OF CURVES

[75] Inventor: John O. Drewery, Sutton, United Kingdom

[73] Assignee: British Broadcasting Corporation, London, United Kingdom

Reexamination Request:
No. 90/002,843, Sep. 28, 1992

Reexamination Certificate for:
Patent No.: 4,843,468
Issued: Jun. 27, 1989
Appl. No.: 72,889
Filed: Jul. 14, 1987

[30] Foreign Application Priority Data

Jul. 14, 1986 [GB] United Kingdom ............... 8617076

[51] Int. Cl.$^5$ ............................................. H04N 7/01
[52] U.S. Cl. ................................. 358/140; 358/217; 358/209; 358/83; 345/25; 340/744; 365/23; 395/128; 382/1; 382/57

[56] References Cited

FOREIGN PATENT DOCUMENTS 62-264764 11/1987 Japan .

OTHER PUBLICATIONS

Koenderink et al., 8078 Proceedings of the IEEE, vol. 67 (1979) No. 10 Oct. 1979.

*Primary Examiner*—Victor R. Kostak

[57] ABSTRACT

Conventionally, transmission of television images is performed by Raster scanning. To avoid the problems associated with flyback, and the limiting of Raster scanning to image scanning standards it is proposed to transmit images by scanning along a locus defined by a fractal curve. A Peano curve is particularly suitable. Image resolution may be varied by varying the order of curve used to scan the image. Smoothing of a curve of a given order results in a graceful degradation to a curve of lower order so that the image created by a given order is still recognizable when displayed by a lower or higher order.

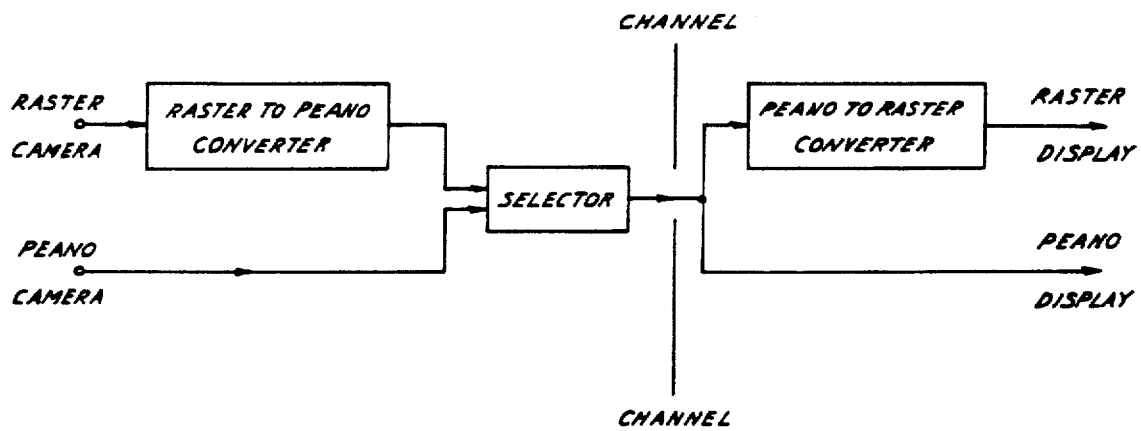

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 4, 11 and 12 are cancelled.

Claims 1, 2, 5-10, 13 and 14 are determined to be patentable as amended.

New claims 15-25 are added and determined to be patentable.

1. A method of [scanning] *communicating* an image *by scanning the image* to produce a signal for transmission and *subsequent* delay comprising
scanning [an] *the* image in a coordinate sequence defined by [one] *a selected* order of a hierarchical set of fractal curves *to form a signal representative of the image,*
*transmitting the signal,*
*receiving the signal, and*
scanning a display along a coordinate sequence defined by a *different selected* order of the hierarchical set of fractal curves to enable a display of the image represented by the signal.

2. A method [of scanning] according to claim 1, [comprising filtering the] *in which a scan following a* coordinate sequence [by means of a filter having] *is filtered with* a raised-cosine [pulse response] *characteristic*.

5. A method according to claim 1 *or claim 2*, wherein the coordinate sequence is defined by a Hilbert curve.

6. A method according to claim 1 *or claim 2*, wherein the coordinate sequence is defined by a Sierpinski curve.

7. A television *system comprising a television* camera[,] comprising,
means for forming a signal indicative of an image [to be transmitted, the signal forming means comprising] scanned in a coordinate sequence defined by *a selected* order of a hierarchical set of fractal curves, *means for transmitting the signal, and*
*a television receiver comprising*
*means for receiving the signal, and*
means for scanning the [image in] *display along a* coordinate sequence defined by [one] *a different selected* order of [a] *the* hierarchical set of fractal curves *to enable display of the image represented by the signal.*

8. A television [camera] *system* according to claim 7, wherein the *television* camera is one of a plurality of synchronized *television* cameras each having [said] signal forming means *for forming a signal representative of an image scanned along a coordinate sequence defined by a different order of the hierarchical set of fractal curves*, each camera being coupled to a selector means for selecting the output *signal* from one of said cameras and transmitting the output [to a] *signal for* display [, the selector being capable of selecting signals representing different orders of fractal curves].

9. A television receiver[,] comprising means for receiving a signal indicative of an image [to be displayed, the signal receiving means] scanned in a coordinate sequence of an order of a hierarchical set of fractal curves, comprising means for scanning the *receiver* display [along] *in a* [co-ordinate] *coordinate* sequence defined by [one] *a different* order of [a] *the* hierarchical set of fractal curves [to form said image from said signal], *to enable display of the image represented by the received signal.*

10. A television [receiver] *system* according to claim [9, comprising] *7, in which the television receiver comprises* signal converting means for converting the received [fractal] signal into a signal suitable for display on a raster display.

13. A television [camera comprising] *system according to claim 7, in which the television camera comprises* a conventional raster camera, the raster output of which is coupled with *signal forming means comprising* converting means for converting [a signal produced by a raster scan to a fractal signal] *the raster output signal of the raster camera to a signal comprising image data in a fractal sequence*.

14. A television [camera] *system* according to claim 13, wherein the converting means comprises picture storage means, means for writing pixel data from the raster scan into said picture storage means in a given sequence; and means for reading said pixel data from said storage means in a different given sequence.

*15. A television system according to claim 5, in which a scan following a coordinate sequence is filtered with a raised cosine characteristic.*

*16. A television system according to claim 7, in which the television camera comprises signal forming means comprising means for scanning the image in a coordinate sequence defined by a selected order of the hierarchical set of fractal curves.*

*17. A television receiver according to claim 9 comprising filter means for filtering the coordinate sequence of the scanning means according to a filter characteristic which curs at half the pixel frequency.*

*18. A television receiver according to claim 9 further comprising a filter having a raised cosine response, to filter the scan defined by the selected fractal order.*

*19. Apparatus according to claim 7, wherein the scanning means comprise means for scanning along a coordinate sequence defined by one order of a Hilbert curve.*

*20. Apparatus according to claim 7, wherein the scanning means comprises means for scanning along a coordinate sequence defined by one order of a Sierpinski curve.*

*21. A method of television reception and display of video signals comprising receiving a signal indicative of an image scanned in a coordinate sequence of an order of a hierarchical sets of fractal curves, and scanning a display in a coordinate sequence defined by a different order of the hierarchical set of curves, to display the image represented by the signal.*

*22. A method according to claim 22, in which the coordinate sequence is filtered with a filter which cuts at half the pixel frequency.*

*23. A method according to claim 22, in which the coordinate sequence is smoothed by taking a running average of four coordinate values.*

*24. A method according to claim 22, in which the scan defined by the selected fractal order is filtered with a raised cosine characteristic.*

*25. A method of scanning an image to produce a signal for transmission and display, comprising scanning the image in a coordinate sequence defined by one order of a hierarchical set of fractal curves, the scan according to the coordinate/sequence being filtered by a filter having a raised-cosine pulse response.*

* * * * *